G. H. LANG.
LISTING MACHINE.
APPLICATION FILED OCT. 3, 1919.

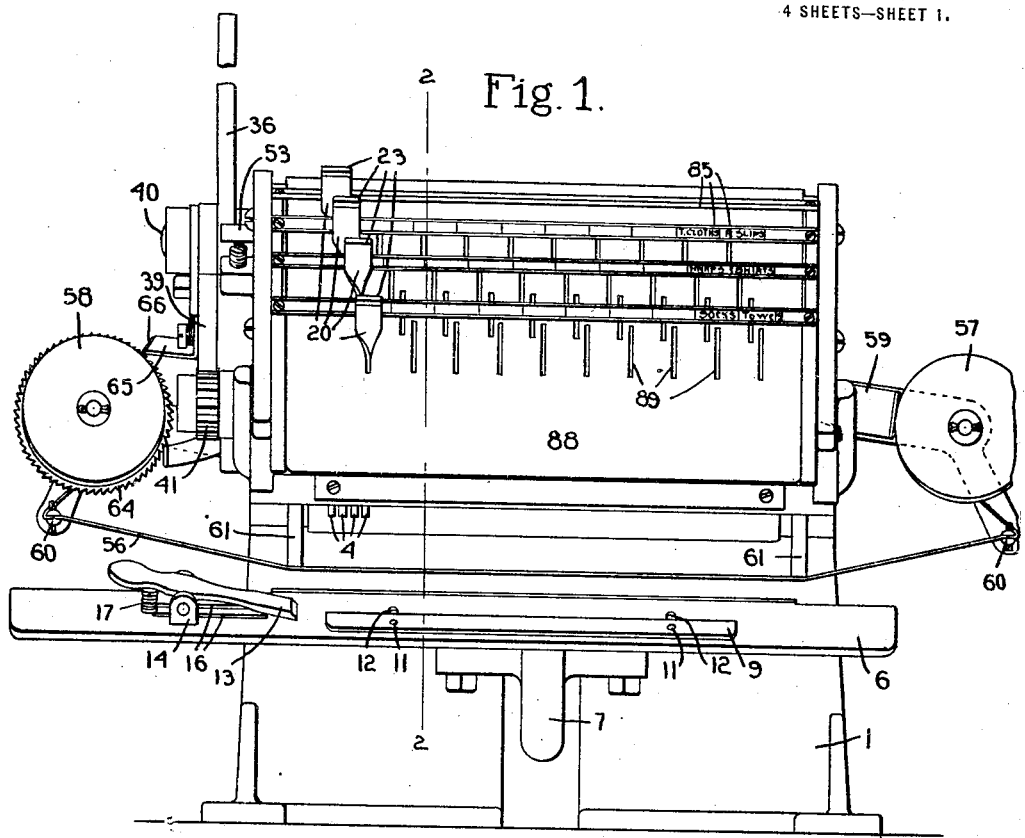

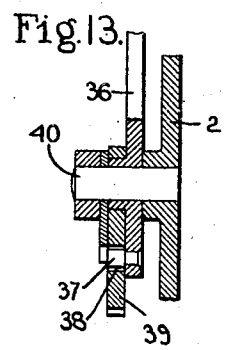
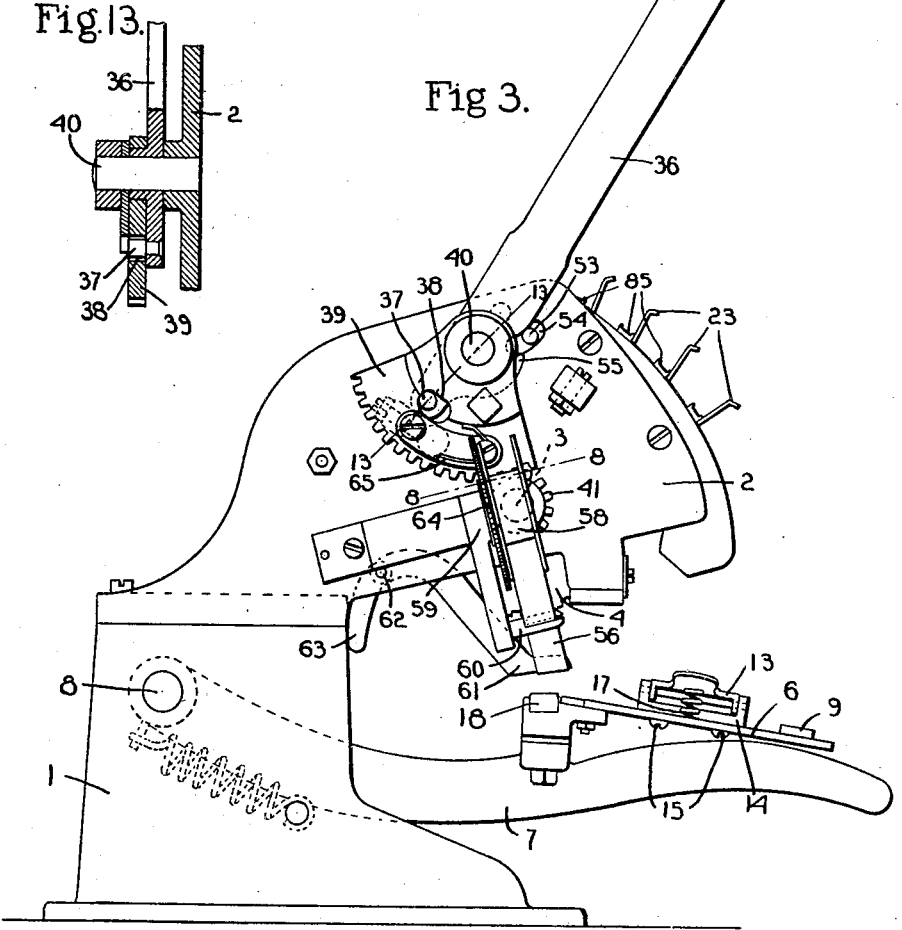
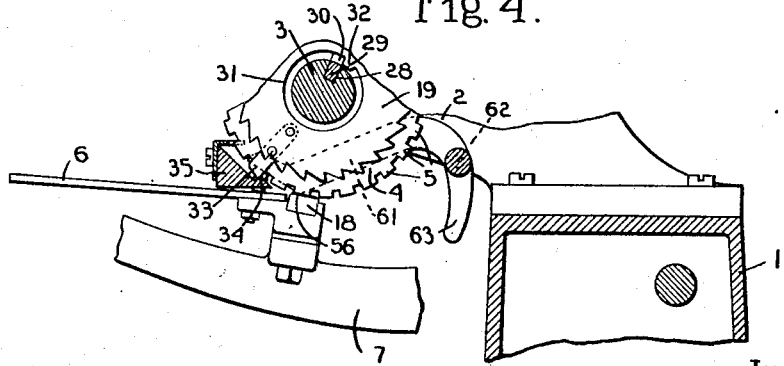

1,352,070.

Patented Sept. 7, 1920.
4 SHEETS—SHEET 3.

Inventor.
George H. Lang
by Heard Smith & Tennant.
Attys.

G. H. LANG.
LISTING MACHINE.
APPLICATION FILED OCT. 3, 1919.

1,352,070.

Patented Sept. 7, 1920.
4 SHEETS—SHEET 4.

Inventor.
George H. Lang
by Heard Smith & Tennant.
Attys.

UNITED STATES PATENT OFFICE.

GEORGE H. LANG, OF BOSTON, MASSACHUSETTS.

LISTING-MACHINE.

1,352,070.    Specification of Letters Patent.    Patented Sept. 7, 1920.

Application filed October 3, 1919. Serial No. 328,142.

*To all whom it may concern:*

Be it known that I, GEORGE H. LANG, a citizen of the United States, residing at Boston, county of Suffolk, State of Massachusetts, have invented an Improvement in Listing-Machines, of which the following description, in connection with the accompanying drawing, is a specification, like characters on the drawing representing like parts.

This invention relates to machines of the type shown in my United States Patent No. 1,103,063, dated July 14, 1914, and which are designed to print on a laundry list the correct number of the different articles which belong in any individual laundry.

The object of the invention is to provide an improved machine of this type which has various novel features, all as will be more fully hereinafter set forth.

In order to give an understanding of my invention, I have illustrated in the drawings a selected embodiment thereof which will now be described, after which the novel features will be pointed out in the appended claims.

In the drawings, Figure 1 is a front view of a listing machine embodying my invention;

Fig. 2 is a section on substantially the line 2—2, Fig. 1;

Fig. 3 is a side view;

Fig. 4 is a detail fragmentary view showing the position of the parts while the printed impression is being made;

Fig. 13 is a section on the line 13—13 Fig. 3;

Fig. 14 is a view showing the construction and operation of the locking member.

Figure 5:
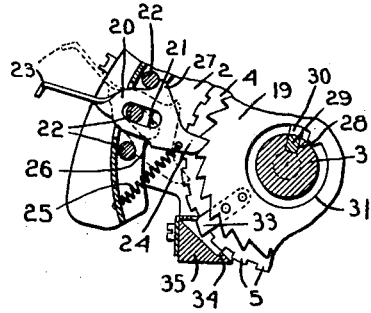
Figs. 5 and 6 are fragmentary detail sectional views showing the manner of manipulating each key for turning the corresponding type wheel forward or backward.

The machine herein shown is of that type which comprises a table on which the laundry list or other article to be printed is placed, a printing head having a plurality of independently-adjustable type wheels, each bearing numerals in consecutive order, a setting key for each type wheel by which the latter may be set, means to bring the table and the printing head into printing relation, and a device to lock the type disks from turning movement after they have been set so as to prevent any change in the setting until after the printed impression has been made.

In the present embodiment of my invention, the printing head carrying the type disks is rigidly supported by a base or frame, and the table on which is supported the laundry list or other article to be printed is pivoted to the base of frame to move toward and from the printing head. The base or frame which carries the printing head is shown generally at 1, and this may conveniently be constructed so that it can be placed on a bench or table. The printing head is formed with two sides plates 2 which extend forwardly from the base 1 and which support a shaft 3 on which the type wheels are mounted. The type wheels are indicated generally at 4 and each is provided with a plurality of peripheral type-bearing projections 5. The character of the type which is placed on these projections 5 will, of course, depend upon the use to which the machine is to be put, but when it is used as a listing machine for listing articles of laundry, the type projections will bear numerals arranged successively from "1" up.

The table on which the work is supported is shown at 6, and it is carried by an arm 7 that is pivoted to the base at 8, and is, therefore, capable of swinging toward and from the printing head. This table 6 is provided at its front edge with a gage member 9 against which the edge of the laundry list or other article 10 is placed, said gage serving to properly position the article for the printing operation. The gage 9 is preferably adjustable on the table and is held in adjusted position by means of clamping screws 11 operating in slots 12 formed in the table.

To further assist in holding the article 10 in proper position, I have provided a spring clamping member 13 which is pivoted to a support 14 that is adjustably secured to the table. This support 14 can be adjusted longitudinally of the table and is held in adjusted position by means of clamping screws 15 which operate in slots 16 formed in the table. The clamping member is acted on by a spring 17 which yieldingly holds it in clamping position.

The table 6 has a platen member 18 associated therewith which is situated to engage the type projections that are in operative position, and during the printing operation, the printing impression is made against this platen 18.

The setting means for each type wheel comprises a toothed disk 19 rigid with the wheel and a setting key 20 which coöperates with the toothed disk for affecting a forward movement of the type wheel. Each setting key 20 is slotted, as shown at 21, and is mounted on a rod 22 which extends from one side piece 2 of the printing head to the other. The setting keys extend through and operate in slots 89 formed in a plate 88 that is situated in front of the type wheels, said slots operating to hold the keys properly spaced. Each setting key is also provided with an outwardly extending portion 23 by which the operator manipulates the key and with a nose portion 24 adapted to engage the toothed disk 19. Each setting key is also acted on by a pulling spring 25 which normally holds it in inoperative position shown in full lines in Figs. 2 and 6.

The type wheels are relatively narrow and, therefore, I prefer to arrange the keys in a bank comprising a plurality of rows arranged one above the other. In this way the portions 23 of the keys can be made wide enough to bear a label indicating some particular article of laundry without interfering at all with the manipulation of the keys. Where the keys are arranged in a bank, there will be one rod 22 for each row of keys, as shown best in Fig. 2. Each key is provided on one edge with a stop shoulder 26 which engages the rod below it when the key is in its normal position, and on the other side with another stop shoulder 27 which is adapted to engage the rod 22 above when the key is fully depressed, as shown in full lines Fig. 5.

Figure 9:
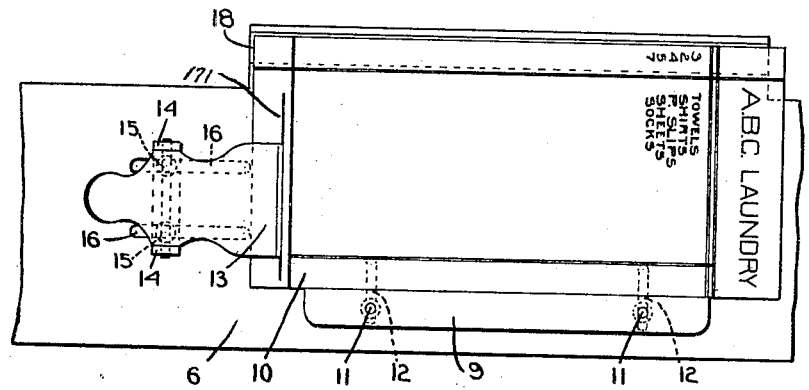
Fig. 9 is a plan view of the table on which the laundry list is placed to be printed.
Figure 10:
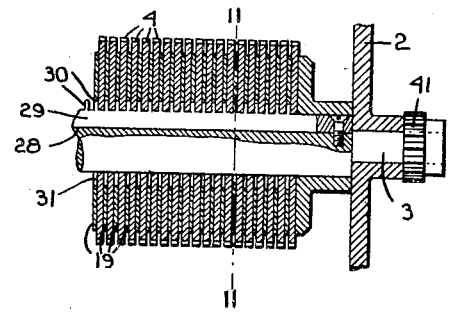
Fig. 10 is a longitudinal sectional view through the shaft which supports the type disks, said view showing a number of type disks thereon.

The operation of setting any type wheel forward involves merely depressing the end 23 of the corresponding key from the dotted to the full line position, Fig. 5. During this turning movement of the key, it swings about its rod 22 as a fulcrum, and the nose portion 24 thereof engages one of the teeth of the toothed disk 19 thereby advancing said disk and the type wheel connected thereto. The stop shoulder 27 for each key is so positioned that when a key is depressed until its stop shoulder engages the rod 22 above it, the corresponding type disk will be advanced one step or the distance between two adjacent type-bearing projections 5. When the key is fully depressed, as shown in full lines Fig. 5, the nose portion thereof fits the notch between two adjacent teeth in the member 19, and so long as the key remains in this position against the stop 27, the type wheel cannot be further advanced. When the key is released the spring 25 returns it to the dotted line position, Fig. 5, and full line position, Fig. 6.

Where the device is used for listing different articles, such as articles of laundry, each key will have a label indicating one particular article, and as the various articles of any bundle of laundry are counted out, the corresponding keys will be depressed once for each article. The labels for the keys will be arranged in the same order as the articles on the printed laundry slip shown in Fig. 9, and the printing wheels have the same spacing as the articles on the laundry list 10. Therefore, when the machine has been set up, as indicated, and a printed impression is made, the type wheels will print on the laundry list the number of the various articles. The table 6 is so constructed that the printing of the number occurs on the left-hand edge of the list 10, as shown in Fig. 9.

When the impression has been printed on any laundry list it is necessary to restore all the type wheels to zero position before setting up the printing head for the next bundle of laundry.

Figure 11:
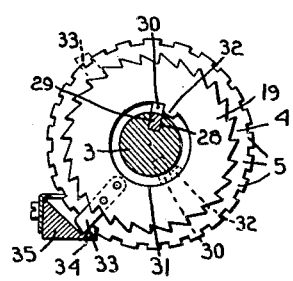
Fig. 11 is a section on the line 11—11, Fig. 10.
Figure 12:
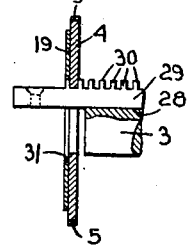
Fig. 12 is a view showing the manner of assembling the type disks and the supporting shaft therefor.

For thus restoring the type wheels, I have provided the following construction:

The shaft 3 is formed with a groove 28 extending longitudinally thereof in which is received a bar 29 having projections 30 which extend beyond the periphery of the shaft 3. The body of the bar 29 has a depth equal to the groove 28, so that the bottom of the space between the projections comes flush with the periphery of the shaft. These projections 30 are spaced apart a distance equal to the width of the type wheels, and the type wheels, therefore, rotate between the projections and are held properly spaced thereby. Each toothed member 19 has a central opening 31 larger than the shaft 3 and is provided with an inwardly-extending projection 32 which is situated to be engaged by a projection 30. Each type wheel is also provided with a stop projection 33 which is adapted to engage a shoulder 34 formed on a bar 35 which extends from one side piece to the other, as shown in Figs. 4 and 11. Each type wheel is in zero position when its stop projection is in engagement with the stop shoulder 34, and at this time, the projection 32 for each type wheel is in engagement with one of the projections 30 of the bar 29, as also shown in Figs. 4 and 11. As each type wheel is set by operating its key, it is advanced clockwise, Figs. 4 and 11, thus carrying the projection 32 a greater or less distance away from the projection 30, depending upon the number of times the key is depressed. To restore the type disks to zero position, the shaft 3 is turned anti-clockwise through substantially a complete revolution, and during this movement the projections 30 thereon will engage the projections 32 of any type wheels which have been set and will return said type wheels to the zero position. If, for instance, it be assumed that the type wheel shown in Fig. 11 has been advanced until the projection 32 occupies the dotted line position, then to restore the type wheel the shaft 3 is turned anti-clockwise to bring the projection 30 into the dotted line position in engagement with the projection 32, and then the turning movement of the shaft is continued until the wheel is restored to its zero position.

Figure 6:
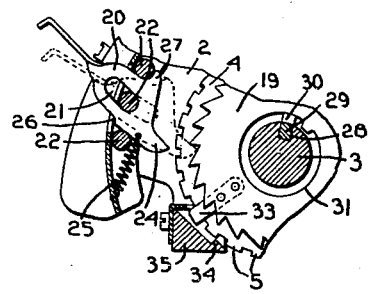

This operation of the shaft is accomplished by means of a restoring lever 36 which is loosely mounted on a stud 40 extending from the frame and provided with a pin 37 operating in a slot 38 formed in a gear segment 39 that is also loosely mounted on said stud 40. The gear segment 39 meshes with a pinion 41 fast on the shaft 3. Swinging movement of the lever 36 backwardly, Fig. 3, will actuate the gear segment 39 and thereby rotate the shaft 3 in a direction to restore the type wheels to zero position. When the type wheels have been restored the lever 36 is returned to the position shown in Fig. 3 thereby returning the shaft 3 to the position shown in Figs. 4 and 11. In setting up the machine, it sometimes happens that the operator makes a mistake and actuates one of the keys too many times. In order to provide for correcting a mistake of this character without the necessity of restoring all of the type wheels to zero position, I have constructed my type wheel setting device so that any individual type wheel can be set backwardly as well as forwardly without disturbing any other type wheel. This is an advantage because it permits the correcting of a mistake in which any type wheel has been advanced beyond its proper point without the necessity of upsetting the other type wheels. The manner in which any type wheel can be set backwardly is indicated in Figs. 5 and 6. This is done by pulling outwardly on any key and at the same time swinging the key downwardly thereby to carry the nose 24 of the key onto the back side of the tooth which the key would engage if it had been depressed in the usual way. This brings the key into the full line position shown in Fig. 5 and then by lifting upwardly on the key and at the same time pressing the key toward the indicating wheel, the nose 24 of the key will act on the back side of the tooth of the member 19, as indicated in dotted lines, Fig. 6, thereby moving the type wheel backwardly one step.

The device herein shown is provided with means somewhat similar to that shown in my above-mentioned patent for locking the type wheels from movement after they have been set. This locking means is in the form of a plurality of locking dogs 42 independently pivoted on a rod 43 which extends between the two sides 2, and each of which is acted upon by a pulling spring 44 that tends normally to hold the nose of the dog against the teeth of the member 19. These locking dogs 42 are thus yieldingly held against the teeth of the toothed members 19 and permit each type wheel to be adjusted forwardly.

Figure 7:
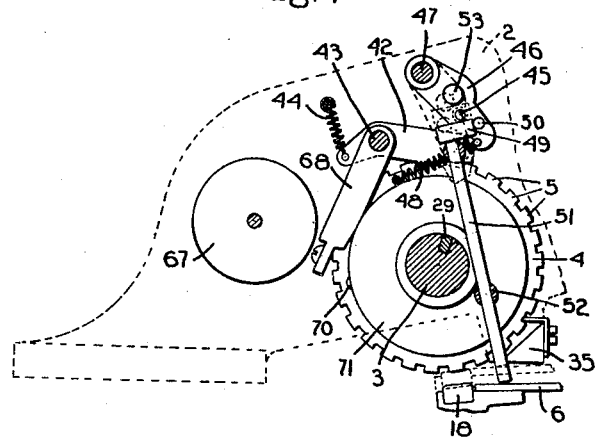
Fig. 7 shows the device for locking the type wheels during the printing operation.

Situated above the locking dogs 42 is a locking bar 45 carried by two arms 46 pivoted at 47 to the sides 2 of the printing head. The arms 46 are acted on by a pulling spring 48 which normally tends to swing them from the full to the dotted line position, Fig. 7, and when in this position, the locking bar 45 is carried over and into engagement with the top edges of the dogs 42, thus holding them positively in engagement with the teeth of the toothed members 19. This locks the type wheels from rotation. Normally the arms 46 are held in the full line position, Fig. 7, in which position the locking bar is out of engagement with the dogs 42, so that said dogs are free to move backwardly as the type wheels are rotated. The arms 46 and locking bar 45 are normally held in this inoperative position by means of a latch member 49 which is adapted to engage a pin or projection 50 carried by one of the arms. Said latch member is mounted on a rod 51 which is slidably mounted in a suitable guide 52 carried by the side piece 2 and the lower end of which is in position to be engaged by the table 6 when the latter is elevated into printing relation with the type disk. Whenever the table is raised to bring the laundry list thereon into contact with the type wheels, as shown by dotted lines, Fig. 7, said table will engage the lower end of the rod 51 and will raise the latch into the dotted line position, thus removing it from engagement with the pin 50. When this occurs, the spring 48 will swing the arms 46 rearwardly, thus bringing the locking bar 45 into locking engagement with the upper edge of the dogs 42. The type wheels are thus locked automatically by the raising of the table and will remain locked while the printing impression is being made.

It is necessary, of course, that the type wheels should be unlocked before they are restored to zero position, and I have provided herein means for automatically unlocking the type wheels by the initial movement of the lever 36 in restoring said type wheels.

One of the arms 46 is provided with a projection 53 which extends through a slot 54 formed in the side piece 2 to which the lever 36 is attached and said lever is provided with a shoulder 55 adapted to engage said pin when the lever is moved backwardly from the position shown in Fig. 3. The full line position of the pin 54 in Fig. 3 is the position corresponding to the full line position Fig. 7, that is, the position of the pin when the locking rod is in its inoperative position. When the locking rod has been released by the latch, the pin 54 will occupy the dotted line position Fig. 3. Owing to the lost motion connection between the lever 36 and the segment 39 due to the pin and slot 37 and 38, the initial movement of the lever 36 to the left Fig. 3 will occur without giving movement to the gear segment, and when the pin 37 reaches the end of the slot 38, then the gear segment will be operated to rotate the shaft 3. During this initial movement of the lever 36, the shoulder 55 engages the pin 54 and swings the locking bar positively from the dotted to the full line position Fig. 7, thus unlocking the dogs 42. This unlocking will occur before the shaft 3 is given its backward movement.

In the machine shown in my former patent I provided an inking mechanism for inking the type wheels. In the present invention the ink for making the printed impression is supplied from a type ribbon 56 which is wound on two reels 57 and 58 journaled in brackets 59 on opposite sides of the printing head. This type ribbon extends through guiding slots formed in guide arms 60 and passes directly over the platen member 18 and beneath the portions of the type wheels which are in position for printing. This type ribbon is normally held separated from the type wheels to permit the latter to be freely set. This is accomplished by means of two fingers 61 which are pivotally mounted on a rod 62 and which rest on the ribbon 56, as shown in Figs. 1 and 2. The weight of the fingers is sufficient to hold the ribbon normally separated from the type wheels. Each finger is provided at its rear end with a tail portion 63 which is adapted to engage the base or frame 1 thereby limiting the downward swinging movement of the finger. When the table is raised for making the printed impression, the platen will engage the ribbon 56 and lift the latter into contact with the type wheels, and by giving the table a quick upward movement so that it will strike the type wheels with a hammer-like blow, the latter will operate through the ribbon 56 to make the desired printed impression.

Figure 8:
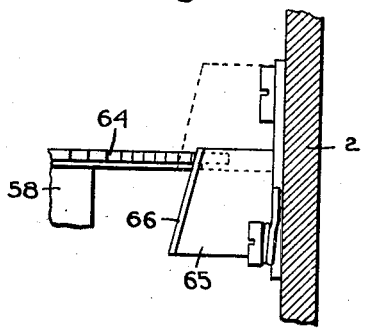
Fig. 8 is a fragmentary sectional view showing the feed mechanism for the type ribbon.
Figure 15:
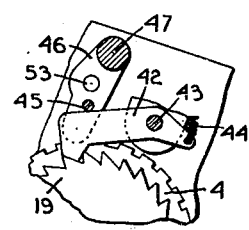
Fig. 15 is a sectional view of the locking member.

I have also provided means for feeding the type ribbon in the direction of its length, and I have herein provided a feeding device which is actuated by the lever 36. The reel 58 is provided with ratchet teeth 64 and the gear segment 39 is provided with a feed dog 65 having an inclined face 66 that is adapted to engage one of the teeth 64. The feed dog 65 is resilient and it is so disposed and constructed that when the gear segment 39 is swung into the position shown in Fig. 3 or from the full to the dotted line position, Fig. 8, the inclined edge 66 of the feed dog will engage one of the teeth 64, and by its camming action against the teeth will rotate the reel 58 one step forward. When the gear segment is returned to the position shown in Fig. 3 or the full line position shown in Fig. 8 it will wipe over the tooth it had previously engaged and will be brought into position to engage the next tooth upon the next actuation of the gear segment. The type ribbon 56 will thus be moved forwardly one step each time the type wheels are restored.

In order that the device may operate properly it is, of course, necessary that the type wheels should be completely restored to zero position after one printed impression has been made and before the type wheels are set up for making a second printed impression. To do this necessitates giving the restoring lever 36 its complete movement in one direction and then bringing it back to its initial position. Sometimes a careless operator will fail to give the lever 36 its complete type-wheel-restoring movement with the result that the type wheels will only be partially restored. To guard against this I have provided herein suitable means to indicate when the lever 36 has completed its type-wheel-restoring movement so that in using the machine the operator moves the lever until the signal device is operative and then returns the lever to its initial position. Any suitable signal device for indicating when the type wheels are completely restored may be used without departing from my invention. I have herein chosen to illustrate an audible signal for this purpose. This signal is shown in the form of a bell 67 secured to one of the side pieces 2 of the machine and a hammer 68 adapted to strike the bell. This hammer is pivoted on the rod 43 and is actuated by a projection 70 on a disk 71 fast on the shaft 3. The construction is such that whenever the shaft 3 is given a complete movement in a direction to restore the type wheels and bring them all into the zero position shown in Figs. 2 and 4, the projection 70 will engage the hammer 68 and throw the latter against the bell, thus causing an audible signal. If, however, the operator fails to properly actuate the lever 36 and thus fails to give the shaft 3 its complete restoring movement, the bell will not be sounded.

In order to make a proper printed impression on the laundry list 10, it is, of course, necessary that the list should be properly positioned on the table in the direction of its length. To assist the operator in doing this I propose to have each laundry list printed with a guiding mark 171 at its lower edge which mark is intended to be placed directly beneath the gripping edge of the clamping member 13, as shown in Fig. 9. In placing the list 10 on the table, the operator raises the clamping member 13 and slips the lower end of the laundry list beneath said clamping member and positions the list so that the biting edge of the clamping member 13 will rest on the guiding mark 171. When the clamping member is lowered into position this will bring the names of the articles on the list 10 into proper position relative to the type wheels.

I have above suggested that suitable labels might be applied to the keys to indicate the article to which the key relates. Instead of applying the label directly to the key I may, and preferably will, place the labels in label-supporting bars situated adjacent the keys. The keys are arranged in rows and I have shown herein a label-supporting bar 85 for each row of keys, each bar being situated directly above the corresponding row of keys. The keys are shown as extending through slots 89 in a front plate 88, and the label-supporting bars 85 are secured to the machine in front of the plate 88. Each bar is channel-shaped and is adapted to receive a plurality of slips of paper, one for each key, and these slips will be printed to indicate the article corresponding to the key. I will preferably connect the various bars 85 so that they constitute a unitary structure and will make them removable from the machine. The advantage of this is that if it is desired to change the character of the list, such change may be effected by removing the connected bars with one set of slips in them and substituting other connected bars with a different set of slips therein. This avoids the necessity of changing the individual slips corresponding to the individual keys and provides a machine which can be quickly changed from one list to another.

It will be noted that the gage 9 is at the front edge of the table 6 and that the type wheels are arranged to make the printed impression on the back edge of the laundry list or that edge which is farthest from the gage 9. The placing of the gage 9 on the front of the table is a convenience because in this position the gage is situated out from under the printing head and is placed so that the operator has plenty of room to bring the edge of the laundry list properly against the gage. These laundry lists are frequently more or less crumpled and by having the gage at the front edge of the work-supporting plate the operator has plenty of room to straighten the crumpled edge and bring it against the gage.

While I have illustrated a selected embodiment of my invention, I do not wish to be limited to the constructional features shown.

Having thus described my invention what I claim as new and desire to secure by Letters Patent is—

1. In a listing machine the combination with a plurality of type wheels each having a toothed member rigid therewith, of an actuating key coöperating with each toothed member for setting the corresponding type wheel and constructed to set said type wheel one step in either a forward or backward direction.

2. In a machine of the class described the combination with a plurality of type wheels, of a slotted setting key for each type wheel, a fulcrum member extending through the slot of each key whereby each key may be turned about its fulcrum and also move bodily in the direction of its length, and a connection between each key and the corresponding type wheel by which a depression of the key moves the type wheel forward one step and elevating the key while pressing it in the direction of its length moves the type wheel backward one step.

3. In a machine of the class described the combination with a plurality of independently settable type wheels, of means to set said type wheels independently, means common to all the type wheels to restore them to zero position, an inking ribbon with which the type wheels engage to make a printed impression, and means operated by the restoring mechanism to feed the inking ribbon.

4. In a machine of the class described the combination with a plurality of independently settable type wheels, of means to set said type wheels, means common to all the type wheels to restore them to zero position, said means including a restoring lever, an inking ribbon with which the type wheels have contact to make a printed impression, and means actuated by said lever to give the ribbon a feeding movement.

5. In a machine of the class described the combination with a plurality of independently settable type wheels, of means to set said type wheels, means common to all the type wheels to restore them simultaneously to zero position, an inking ribbon with which the type wheels have contact to make a printed impression, two reels on which said ribbon is wound, and means actuated by the restoring mechanism to rotate one of the reels and thereby give the ribbon a feeding movement.

6. In a machine of the class described the combination with a plurality of independently settable type wheels, of means to set said type wheels, means common to all the type wheels to restore them to zero position, said means including a restoring lever, an inking ribbon with which the type wheels have contact to make a printed impression, two reels on which said ribbon is wound, and means for rotating one reel by the movement of the lever.

7. In a machine of the class described the combination with a plurality of type wheels, of setting means therefor, a table to support the article to be printed, said table and type wheels being capable of a relative movement toward and from each other, a connecting ribbon situated between the table and type wheels, and yielding means normally holding the ribbon separated from the type wheels, but permitting said ribbon to come into contact with the type wheels when the printed impression is being made.

8. In a machine of the class described the combination with a plurality of type wheels, of setting means therefor, a table to support the article to be printed, said table and type wheels being capable of a relative movement toward and from each other, a connecting ribbon situated between the table and type wheels, and weighted arms resting on the type ribbon and normally holding it separated from the type wheels, but permitting said ribbon to be brought into contact with the type wheels when the table and type wheels are in printing relation.

9. In a machine of the class described the combination with a plurality of independently settable type wheels, of means to lock all the type wheels from movement after they have been set, means to restore the type wheels simultaneously to zero position, and means actuated by the restoring mechanism to unlock the type wheels.

10. In a machine of the class described the combination with a plurality of independently settable type wheels, of means to lock said type wheels from movement after they have been set, means including a lever to restore the type wheels to operative position, and means actuated by the initial movement of said lever to unlock the type wheels.

11. In a machine of the class described, the combination with a plurality of independently settable type wheels, of a shaft on which said type wheels are rotatably mounted, means associated with said shaft to restore all the type wheels simultaneously to zero position, a lever for giving said shaft its type wheel restoring movement, means to lock all of the type wheels from movement after they have been set, and means whereby initial movement of said lever will unlock the type wheels thus permitting them to be restored.

12. In a machine of the class described, the combination with a printing head having type wheels, of a table for supporting the article to be printed, a clamping member for holding the article to the table, said clamping member having a clamping edge which constitutes a gage to coöperate with a guiding mark on said article to properly position the latter.

13. In a machine of the class described, the combination with a plurality of independently-settable type wheels, of means to set said type wheels, means including a lever for restoring the type wheels simultaneously to zero position, and a device to indicate when the lever has been moved to fully restore all the type wheels.

14. In a machine of the class described, the combination with a plurality of independently-settable type wheels, of means to set said type wheels, means including a lever for restoring the type wheels simultaneously to zero position, and a signal actuated by said lever when the latter has been actuated sufficiently to restore all the type wheels to zero position.

15. In a machine of the class described, the combination with a plurality of independently-adjustable type wheels, of a depressible key for setting each type wheel, said keys being arranged in a row, and a member extending longitudinally of said row of keys and adapted to removably contain indication slips, one for each key to indicate the article corresponding to said key.

16. In a machine of the class described, the combination with a frame, of a plurality of independently-adjustable type wheels carried thereby, a key for setting each type wheel, said keys being arranged in a plurality of rows, a bar-like member extendng longitudinally of each row, said members being connected and detachably secured to the frame and each adapted to hold a plurality of indicating slips, one for each key in the row.

17. In a machine of the class described, the combination with a printing head, of a table for supporting the article to be printed, the rear portion of the table being situated beneath the printing head, and the front edge of the table projecting some distance beyond the printing head, and a gage on the front projecting portion of the table for positioning the article to be printed whereby the operator has free space in front of the printing head for placing the front edge of the article against and holding it in contact with the gage during the printing operation.

18. In a machine of the class described, the combination with a printing head having type wheels, of a table for supporting the sheet to be printed, which sheet has a transversely extending guiding mark near one end, a clamping member for holding said sheet to the table, said clamping member having a clamping edge extending transversely of the sheet and constituting a gage to coöperate with said guiding mark to properly position the sheet.

In testimony whereof I have signed my name to this specification.

GEORGE H. LANG.